United States Patent [19]

Bernasconi

[11] 4,229,995
[45] Oct. 28, 1980

[54] LOCKING MECHANISM FOR AN ADJUSTABLE SPINDLE DRIVE

[75] Inventor: Felix R. Bernasconi, Zollikerberg, Switzerland

[73] Assignee: BBC Brown, Boveri & Company, Limited, Baden, Switzerland

[21] Appl. No.: 20,745

[22] Filed: Mar. 15, 1979

[30] Foreign Application Priority Data

Mar. 16, 1978 [CH] Switzerland ............. 2859/78

[51] Int. Cl.³ ............................................. F16D 7/00
[52] U.S. Cl. ................................... 74/625; 192/150
[58] Field of Search ......................... 192/150; 74/625

[56] References Cited

U.S. PATENT DOCUMENTS

| | | | |
|---|---|---|---|
| 2,525,915 | 10/1950 | Kuhn | 74/625 X |
| 2,703,991 | 3/1955 | Kron | 74/625 |
| 2,858,919 | 11/1958 | Jones | 74/625 X |
| 2,895,781 | 7/1959 | Latter | 74/625 X |
| 2,975,034 | 4/1961 | Geyer | 74/625 X |
| 3,161,014 | 12/1964 | Abild | 74/625 X |
| 3,198,033 | 8/1965 | Fry | 74/625 |
| 3,515,250 | 6/1970 | Cantalupo | 74/625 X |
| 3,628,397 | 12/1971 | Sheesley | 74/625 |
| 3,700,085 | 10/1972 | Balz | 192/150 X |

Primary Examiner—Nile C. Byers, Jr.
Attorney, Agent, or Firm—Burns, Doane, Swecker & Mathis

[57] ABSTRACT

A valve spindle drive is disclosed in which the travel of the spindle is limited by a locking mechanism. The spindle is driven by a gearing system on which locking rings are provided. Each locking ring permits rotation in one direction. Arms resiliently mounted on the valve housing carry a second pair of locking rings for mating with the rings on the gearing system. Deflection of the arms during travel of the spindle actuates switches for controlling a spindle motor drive. Movement of the spindle and gearing relative to the second pair of locking elements provides for engagement of a pair of respective locking rings to prevent further spindle travel. The other pair of rings is prevented from coupling by a cam device carried by the gearing.

14 Claims, 12 Drawing Figures

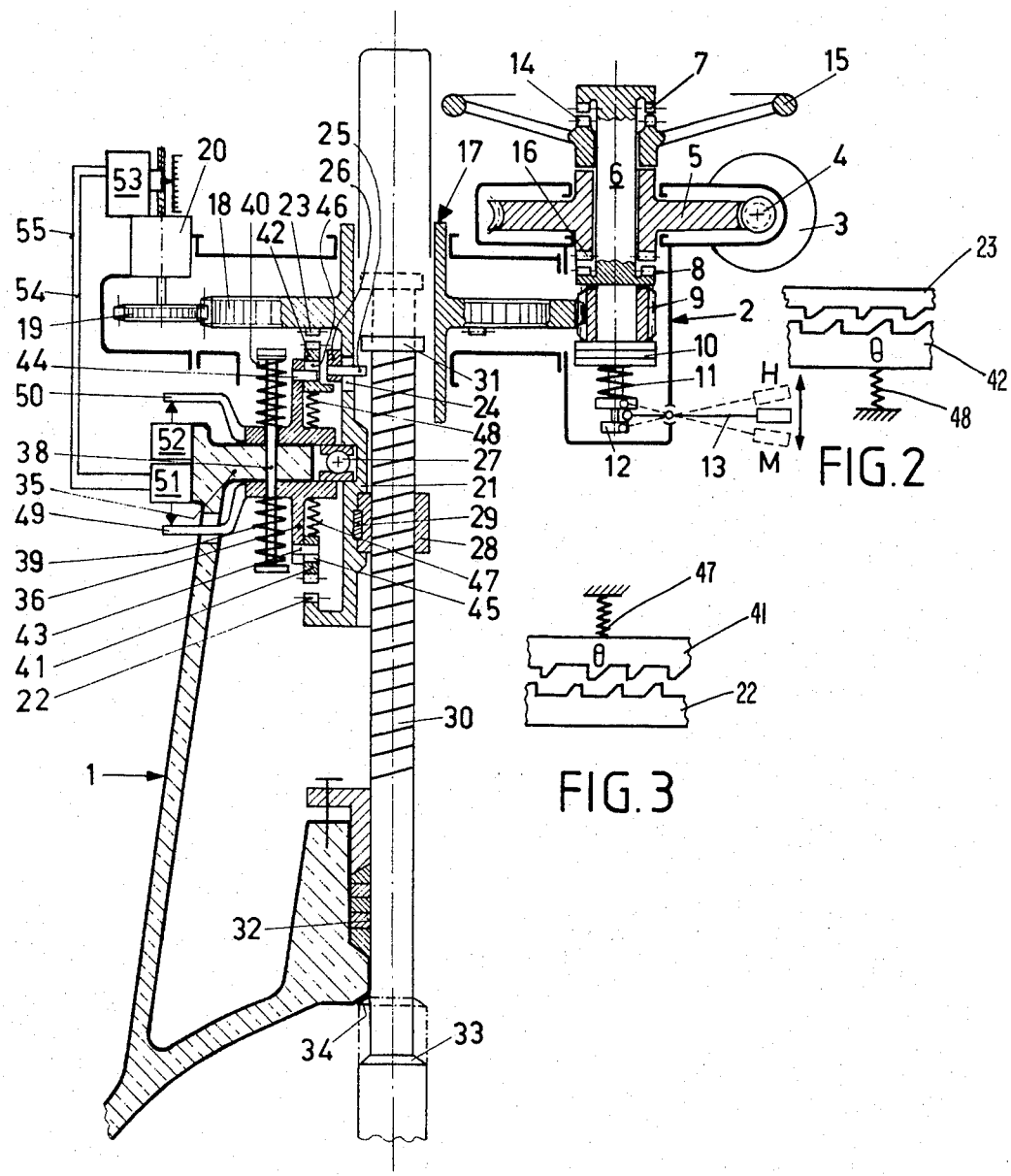

FIG. 5
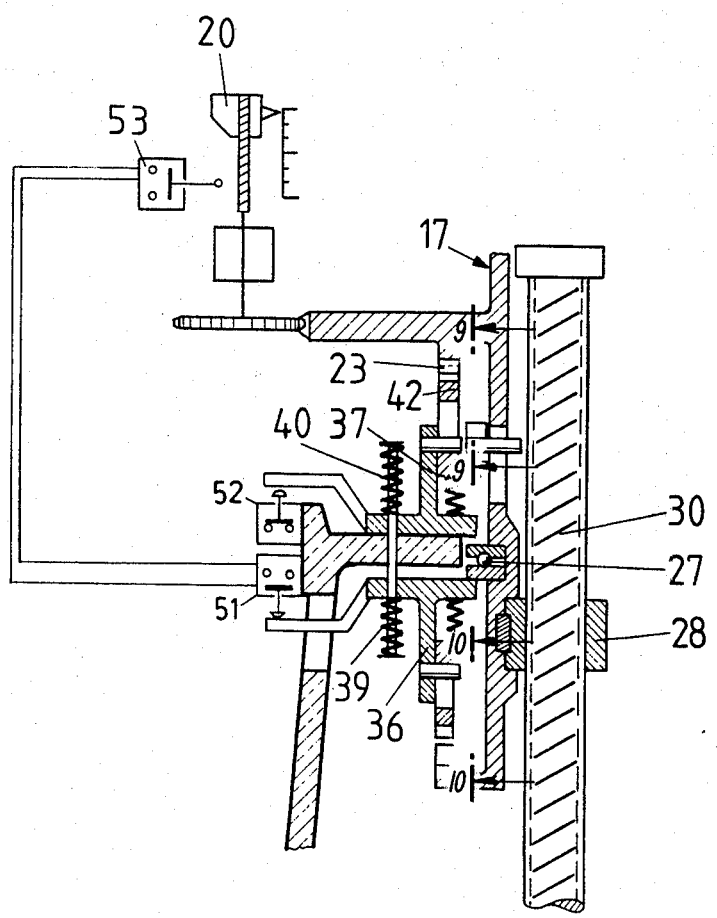
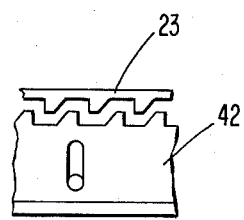
FIG. 9
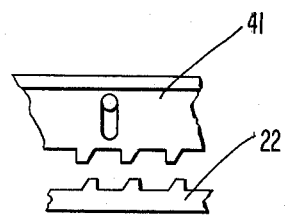
FIG. 10

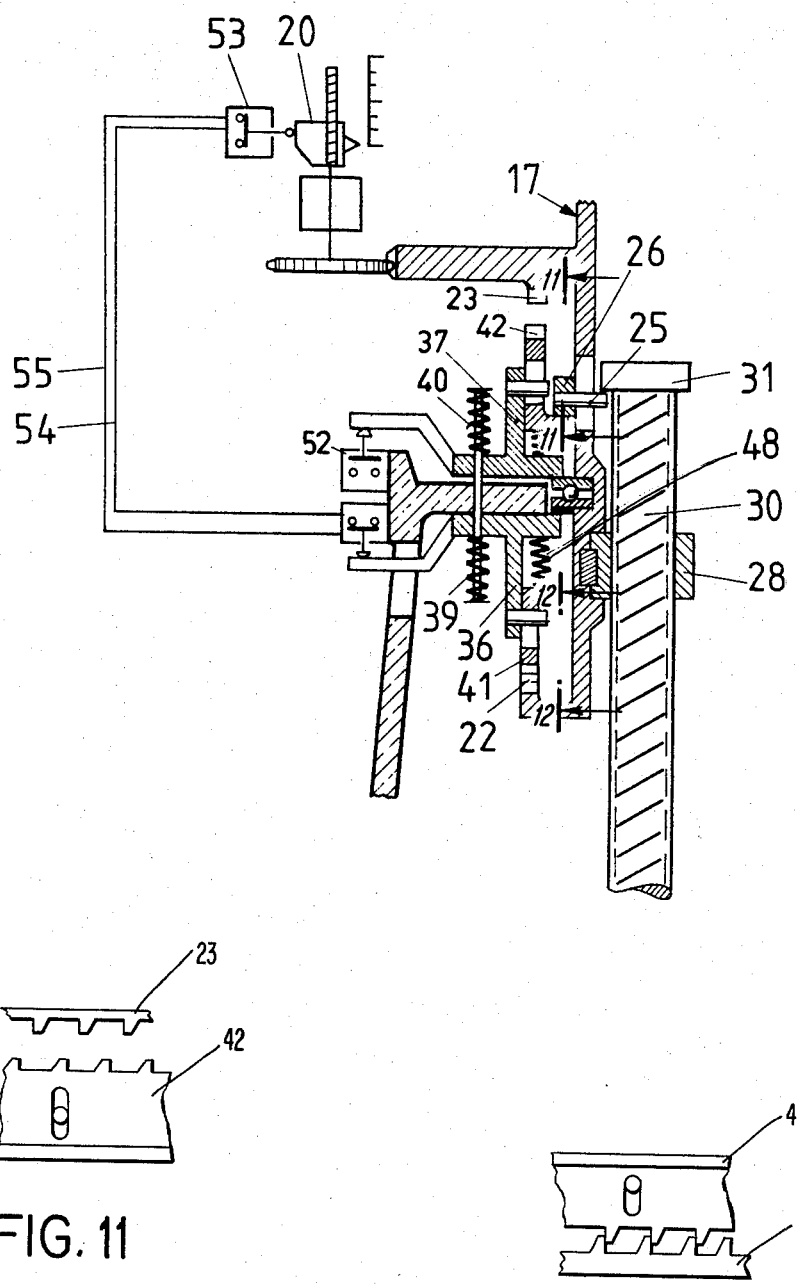

LOCKING MECHANISM FOR AN ADJUSTABLE SPINDLE DRIVE

BACKGROUND AND SUMMARY OF THE PRESENT INVENTION

The invention relates to a locking mechanism for a spindle drive.

Locking devices as previously known employ limiting switches to monitor and control the travel of the moving parts of the spindle drive. If these devices fail or are bypassed, spindle travel is stopped by torque switches. Due to the inertia of the system comprising the drive motor and gearing, the actual moment applied to the components of the member connected to the spindle, typically a valve, will exceed the magnitude of the moment set at the torque switch. The moment generated can be of such a magnitude that damage will occur to the components of the valve. Due to variations in the friction generated within the drive as well as between the spindle nut and the spindle, the torque indicated by the torque switches will not be an accurate measure of the axial forces exerted on the spindle and overstressing may occur.

In addition to the load generated by the torque switches, thermal stresses caused by differences in tension due to a temperature gradient in the spindle when lodged in an end position will be present. Such stresses can result in bending of the spindle when subjected to an axial load in addition to sizing or freezing of a sliding valve connected to the spindle. Jamming of the valve can lead to costly operational shut-downs or curtailments in service and it is therefore necessary to employ devices of maximum operational reliability. This is especially true in the case of nuclear power plants, where there is only a very limited amount of time available for maintenance due to the dange of radiation.

It is therefore an object of the present invention to provide a locking mechanism in which locking elements are used to avoid any overloading of the valve spindle and its driving components and thus minimize any damage or jamming of the valve.

The locking mechanism of the present invention is provided with locking elements for the spindle drive. A drive unit selectively provides for motorized or manual drive of a gearing which axially adjusts the spindle position. Travel of the spindle is stopped by the locking elements and the gearing has a friction clutch located between the drive unit and the gearing to break overtravel of the spindle. Switching devices actuated by the gearing regulate travel of the valve spindle. The gearing which axially adjusts the valve spindle has a gear body which is rigidly connected with a spindle nut and carries two locking elements, the elements being operative in opposite directions of rotation. Two arms which are resiliently mounted to deflect along the longitudinal axis of the spindle but rigid in the horizontal direction are provided on a flange of the housing. Each arm carries one locking ring which interacts with a respective locking element on the gear body and deflects resiliently relative to its respective arm. The gear body is engaged between the arms by means of a bearing and deflects along the axis of the valve spindle. Two electric switches, each being actuated by the deflection of the associated arm mounted on the flange, and one terminal switch which provides for a periodic bypass of the lower switch and is actuated by the valve lift operate to regulate the travel of the spindle. Additionally, the gearing is provided with a cam device to shift the upper locking element relative to its respective resiliently mounted arm.

BRIEF DESCRIPTION OF THE DRAWINGS

The present invention will be described with reference to the accompanying drawings, in which like members bear like reference numbers and in which:

FIG. 1 is a cross-sectional view of the locking mechanism of the present invention shown in an intermediate position;

FIG. 2 is a detailed view of the position of the upper locking elements when the spindle is in the position shown in FIG. 1;

FIG. 3 is a detailed view of the position of the lower locking elements when the spindle is in the position shown in FIG. 1;

FIG. 5 is a cross-sectional view of the locking mechanism when the valve is in a fully-opened position;

FIG. 6 is a cross-sectional view of the locking mechanism when the valve is in a closed position;

FIG. 9 is a detailed view of the position of the upper locking elements when the spindle is in the position shown in FIG. 5;

FIG. 10 is a detailed view of the position of the lower locking elements when the spindle is in the position shown in FIG. 5;

FIG. 11 is a detailed view of the position of the upper locking elements when the spindle is in the position shown in FIG. 6; and FIG. 12 is a detailed view of the position of the lower locking elements when the spindle is in the position shown in FIG. 6.

DETAILED DESCRIPTION OF THE PREFERRED EMBODIMENT

Figure 4:
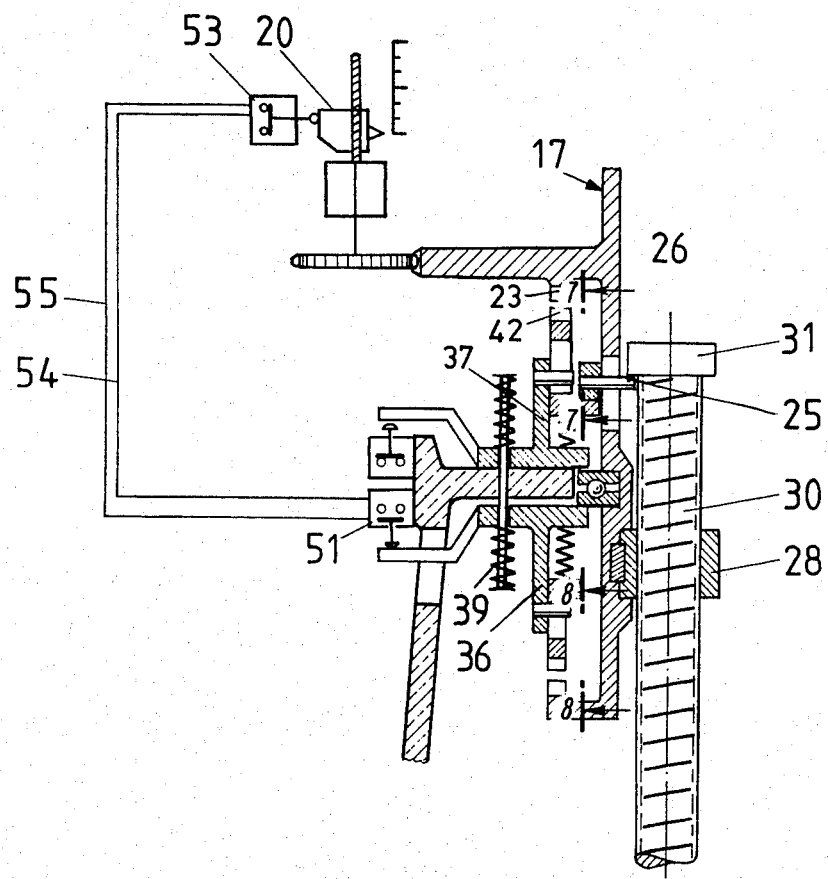
FIG. 4 is a cross-sectional view of the locking mechanism during the valve opening process.
Figure 7:
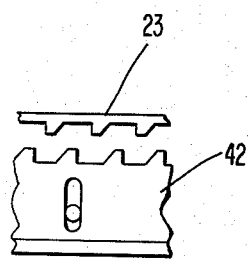
FIG. 7 is a detailed view of the position of the upper locking elements when the spindle is in the position shown in FIG. 4.
Figure 8:
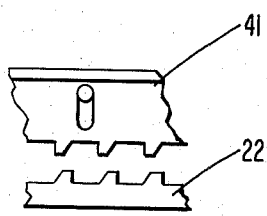
FIG. 8 is a detailed view of the position of the lower locking elements when the spindle is in the position shown in FIG. 4.

With reference to FIG. 1, a housing 1 of a valve is shown, in which the valve components, which may include a wedge-type slide, a conical valve member or the like together with associated seating elements, are not illustrated as they are not essential elements of the invention. A drive unit 2 is flanged to the upper part of the housing. This arrangement of the drive unit allows for a rapid disassembly of the unit in tne event of an operational failure without the need for removing the entire valve and without any change in the mechanical sealing and the electrical interlock.

The drive unit 2 is provided with a reversible electric motor 3 which drives a helical gear 5 by means of a worm gear 4. The hub of the helical gear 5 is coupled to a rotatable shaft 6 provided with two spur guide rings 7, 8 and a spur pinion 9 rotatably mounted at the lower end of the shaft 6. At the bottom of the drive unit 2 is a friction clutch 10 which is joined to the pinion 9. The pulling power of the clutch is adjusted by means of a spring 11 and a sleeve joint 12 which is engaged by a change lever 13. By swiveling the lever 13 it is possible to place the shaft 6 into either one of two positions, shown by broken lines in the drawing, namely position H, manual drive or position M, motorized drive. The shaft 6 therefore engages either a toothed coupling ring 14 on a handwheel 15 or a toothed coupling ring 16 arranged at the bottom portion of the helical gear 5. The friction clutch 10 will prevent any overstressing of the gearing in the event of a high frictional resistance at the time of valve actuation.

The pinion 9 engages a gear unit 17 which includes a toothed gear 18 that meshes with a gear 19 of a valve lift indicator 20. The valve lift indicator 20 is known in the prior art and is not a part of this invention.

The gear unit 17 extends downwardly and forms a substantially cylindrical jacket 21 which carries a locking ring 22 at its lower end. A second locking ring 23 of identical size but having a reversed locking direction is provided at the bottom side of the toothed gear 18.

At the upper portion of the jacket 21 are several slots 24 which are distributed about the jacket perimeter. The slots 24 loosely accommodate bolts 25 which are secured to a ring 26 encircling the jacket 21. The ring 26 and the bolts can slide up and down within the slots 24, with the bolts 25 preventing the ring from turning. At the outer perimeter of the jacekt 21 is a slot in which an axial roller bearing 27 is mounted. A spindle nut 28 which is fixed in an axial direction and restrained from turning relative to the jacket 21 by means of a cotter pin 29 engages a valve spindle 30. The nut 28 is located within the jacket interior and provides for axial movement of the valve spindle 30, which has a neck 31 at its upper end. A cone 33, disposed below a gland packing 32 in the valve body, provides a reverse seal for relieving the gland pressure when the valve is fully opened, with the cone 33 being forced against a seat 34.

The axial roller bearing 27, illustrated as an axial ball bearing, is positioned in the embodiment shown in FIG. 1 within the region of a flange 35 which is at the same level as the axial bearing 27. The flange serves as a support for two arms 36, 37, with the arms being guided along the longitudinal axis of the spindle and secured against turning by means of guide rods 38 which are distributed over the face of the flange. Springs 39, 40, which are seated against the ends of the guide rods 38, are of a selected spring constant and force the arms against the flange 35. The outer rim of the axial bearing 27 is therefore resiliently engaged between the two arms 36 and 37.

Locking rings 41 and 42 are carried by the arms 36, 37 and move along the longitudinal axis of the spindle. The locking rings 41, 42 are prevented from turning by several bolts 43 and 44 which are distributed over the perimeter of the arms and engage slots 45 and 46 of the rings 41, 42, thereby permitting sliding of the rings in the direction of the spindle axis with the movement being limited by the length of the slots. Several springs 47, 48 are distributed about the perimeter of the arm and seat against the adjacent arm. The springs urge the locking rings 41 and 42 into their upper and lower operative positions.

Each of the arms 36, 37 is provided with a contact arm 49, 50 for actuating electric switches 51 and 52.

The lower switch 51 is electrically connected to a terminal switch 53 by cables 54, 55. The terminal switch 53 is positioned at the valve lift indicator 20 and is actuated by the indicator when spindle is in the lower operative position. A bridging circuit of known design (not illustrated) is located within the housing of the terminal switch 53 to ensure a continuous current supply for the motor 3 when the switch 51 opens.

FIG. 1 shows the valve spindle 30 in an intermediate position between "closed" and "fully open." In this position the spindle nut 29 is not subjected to any forces since the weight of the valve spindle and of the valve member, for example, a slide plate or the like fastened to the spindle, is taken up by the friction of the gland packing. Since the springs 39 and 40 which bias the arms 36 and 37 are under compression they will counter the weight and the friction of the spindle and the attached valve member as well as any gland packing friction and hydraulic spindle force. Therefore, the bearing 27 will be maintained in a neutral position, with the two arms resting at the flange 35.

FIGS. 2 and 3 show the respective positions of the upper and lower locking rings 41, 42 when the valve spindle is in the position shown in FIG. 1. Neither the upper nor the lower locking rings 41, 42 are engaged in the intermediate position.

FIG. 4 illustrates the gearing at the beginning of the valve opening process. It is assumed that the valve member consists of a conical slide valve which initially creates a relatively large frictional resistance since the valve must be forced from a conical seat. During the opening process, the motor-driven nut 28 moves downwardly together with the gear body 17, thereby urging the lower arm 36 downward against the resistance of the springs 39. The contact arm 50 opens the switch 51, with the current supply for the motor 3 being maintained by the bridging circuit provided within the housing of the terminal switch 53. The drive of the spindle nut therefore continues without interruption.

When the spindle is in the lower end position, the neck 31 on the spindle head is forced against a presspad, consisting of the bolt 25 and the ring 27. The presspad slides downwardly in the slot 26 to prevent the locking teeth of the upper locking ring 42 from engaging the teeth of the upper locking ring 23 on the gear body 17 for a certain period during the travel of the spindle. Without the presence of the press pad, the ring 23 on the gear body 17 would engage the teeth on the locking ring 42 during this phase of the spindle travel and thereby prevent the gear body 17 as well as the spindle nut 28 from continuing to turn.

After the spindle has traveled a certain distance, the neck 31 releases the press pad, allowing the pad as well as the locking ring 42 to return to their normal positions illustrated in FIG. 1. When the spindle has reached this position, the wedging effect of the valve member against the seat has ceased, the resistance to the lift of the spindle 30 will drop to the normal valve represented by the dead weight of the spindle and the gland packing friction. The compressed springs 39 then urge the arm 36, the bearing 27 and the gear body 17 into the neutral position shown in FIG. 1. The lower switch 51 is again closed and the current supply for the motor is not interrupted during the switching operation due to the presence of the above-mentioned bridging circuit.

As the spindle continues to travel, the spindle drive elements will maintain their positions until the spindle has reached the upper limit of travel, which means that the valve is fully opened.

Throughout the entire opening process, the locking rings 22, 23 of the gear body 17 do not engage the locking rings 41, 42 of the arms 36, 37.

FIG. 5 illustrates the position of the gear system when the valve is fully opened, with the housing being sealed against the outside by the mating of joint 33, 34 of the reverse seal, illustrated in FIG. 1 by the dotted lines.

In this position, the spindle cannot move longitudinally and the spindle nut, its drive continuing, is forced downwardly by overcoming the resistance of the lower springs 39 which act upon the arm 36. The gear body 17, the bearing 27 and the lower arm 36 also move downwardly while the two lower locking rings 22 and 41 maintain their relative positions and do not engage each other. The upper ring 23 then engages the teeth on ring 42 since the ring and the adjacent upper arm 37 remain relatively stationary as the gear body 17 carrying locking ring 23 moves downwardly.

During the movement of the lower arm 36, the switch 51 is again opened but the current supply for the electric motor 3 is not interrupted due to the presence of the above-mentioned bridging circuit in the terminal switch housing 53. The terminal switch is set in such manner that it cuts off the motor 3 just prior to the meshing of the teeth of rings 23 and 42. The gear body 17, which continues to rotate due to the mass moment of inertia of the drive mechanism quickly stops after the meshing of rings 23 and 42, when the cone 33 of the reverse seal makes contact with the seat 34. The kinetic energy which is present within the gear system and the drive unit after the meshing is absorbed by the friction clutch 10.

The closing process will be explained with reference to FIGS. 5 and 6, in which FIG. 6 illustrates the position of the gearing when the mechanism is fully closed. At the beginning of the closing operation, the gear elements are in the positions shown in FIG. 5. The locking rings 23 and 42 are engaged and prevent the gear body 17 from turning and lifting the spindle. The teeth of the two locking rings 23 and 42 do permit a turning in an opposite direction, with the locking ring 42 yielding in a downward direction against the resistance of the springs 48. During this turning motion, the spindle nut 28 initially moves upward until the axial bearing makes contact with the upper arm 37. The thrust of the nut 28 then reverses to rotate the spindle downwardly. The spindle, together with the attached valve member, then moves downwardly after overcoming the resistive forces, which may typically include: friction between the gland packing and guide, the hydraulic spindle forces, the hydraulic seating force of the reverse seal, and the dead weight of the spindle and valve member.

The spring 40 of the upper arm 37 exerts a greater force than the sum of these resistive forces when in a compressed state, but does not exert a force which could cause any buckling or overstressing of the spindle.

When the mating joint 33 and 34 of the reverse seal has been broken, the spindle rotates downwardly until the valve member reaches the closed position. The sliding resistance of the spindle rises and the spindle nut turns in an upward direction to lift the upper arm 37. Lifting of this arm 37 switches off the motor 3 by actuating the terminal switch 52, thereby allowing the lower locking ring 22 to mesh with the locking ring 41 as arm 37 continues to lift. This meshing of the rings prevents any further turning in the closing direction.

The kinetic energy of the motor drive is again absorbed by the friction clutch 10 mentioned above.

It is necessary to prevent the upper locking ring 23 from engaging the stationary locking ring 42 when a possibly jammed sliding valve opens. Movement of the valve during the initial opening phase could move the spindle nut 28 and the gear body 17 downward by exerting a pull on the spindle and cause damage to the spindle drive or valve components. Therefore, the neck 31 on the head of the spindle 30 is seated against the press pad during the final stage of the closing stroke and urges the upper locking ring 42 against the force of the springs 48. When the spindle has traveled a certain distance during the opening process, the neck 31 release the press pad and with it the locking ring 42.

The lower locking ring 22 of the gear body 17 engages the stationary locking ring 41 at the end of the closing process to prevent further turning. These rings are disengaged from each other during the opening process when the nut reverses its turning direction to allow an unimpeded turning of the spindle.

The known position indicator 20 locally as well as by remotely displays the specific position of the spindle or locking element. It is also possible to utilize other types of locking devices which prevent rotation in one direction of rotation in place of the locking rings described herein.

The principles, preferred embodiment and modes of operation of the present invention have been described in the foregoing specification. The invention which is to be protected is not to be limited to the disclosed forms as these are illustrative and not restrictive embodiments. Variations may be made by those skilled in the art without departing from the nature and scope of the present invention.

What is claimed is:

1. A spindle drive comprising:
   a spindle rotatable within a housing;
   first locking means for limiting rotation of the spindle operatively connected to said spindle and axially movable relative to said spindle;
   second locking means for limiting rotation of the spindle engageable with said first locking means, said second locking means being resiliently mounted; and
   cam means for shifting said second locking means relative to said first locking means to prevent engagement thereof during a selected rotation of the spindle;
   wherein a predetermined rotation of said spindle causes said first locking means to engage said second locking means to prevent continued rotation of the spindle.

2. The spindle drive according to claim 1 further comprising drive means for rotating said spindle and gear means engaging said drive means with said spindle.

3. The spindle drive according to claim 2 wherein the first locking means and the cam means are carried by said gear means.

4. The spindle drive according to claim 2 wherein the gear means includes a friction clutch to brake overtravel of the spindle.

5. The spindle drive according to claim 2 including switch means for actuating said drive means, wherein said switch means is actuated by biasing said second locking means.

6. The spindle drive according to claim 1 wherein the first locking means includes upper and lower locking rings and the second locking means includes upper and lower spring-biased locking rings, wherein rotation of the spindle displaces the first locking means so that the upper rings of the first and second locking means are selectively engaged to maintain the spindle in a first position and the lower rings are selectively engaged to maintain the spindle in a second position.

7. The spindle drive according to claim 5 wherein the spindle operatively engages said second locking means to bias said resiliently mounted second locking means, thereby actuating the switch means.

8. The spindle drive according to claim 6 wherein the cam means engages the upper ring of the second locking means, thereby preventing engagement with the upper ring of the first locking means.

9. A spindle drive comprising:
a housing;
a spindle rotatable within said housing;
a gear drive for rotating said spindle and axially movable relative to the spindle;
said gear drive including locking elements which limit rotation of said spindle;
locking elements for engaging said locking elements on said gear drive;
said locking elements being resiliently mounted on said housing and operatively engaged by the gear drive;
switches for actuating the gear drive, said switches being controlled by deflection of said resiliently mounted locking elements when engaged by the gear drive; and
a shiftable cam carried by said gear drive for selectively maintaining said resiliently mounted locking elements out of engagement with said locking elements on the gear drive;
wherein said locking elements on said gear drive engage said resiliently mounted locking elements during a selected period of spindle travel to prevent continued rotation of the spindle.

10. The spindle drive according to claim 9 wherein said gear drive includes a friction clutch to brake overtravel of the spindle.

11. The spindle drive according to claim 9 wherein said resiliently mounted locking elements are operatively engaged by a bearing carried on said gear drive so that relative axial movement of the gear drive deflects the resiliently mounted locking elements to actuate the switches.

12. The spindle drive according to claim 9 wherein the locking elements are toothed rings which provide for rotation in one direction.

13. The spindle drive according to claim 9 wherein the shiftable cam is a ring disposed about said gear drive and axially restrained in a slot therein which provides for limited axial movement of the cam against the resiliently mounted locking elements.

14. The spindle drive according to claim 9 wherein the switches include a bridging circuit for selectively providing continuous operation of the gear drive when the switches are in an open position.

* * * * *